Oct. 12, 1937.    G. D. MORGAN    2,095,510
MEAT PACKAGE
Filed Dec. 4, 1936
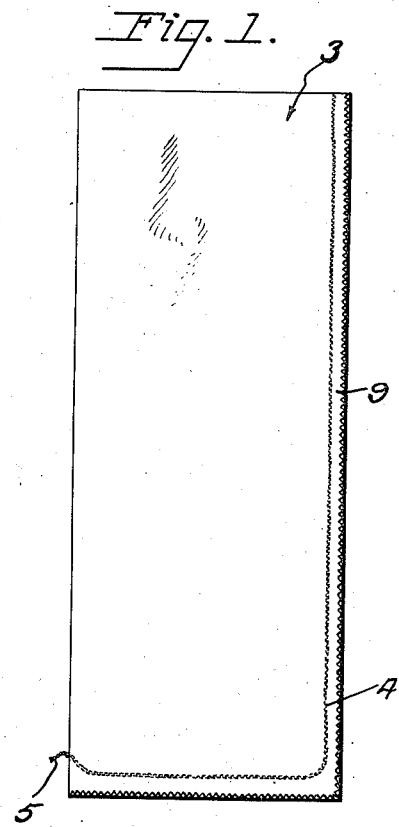
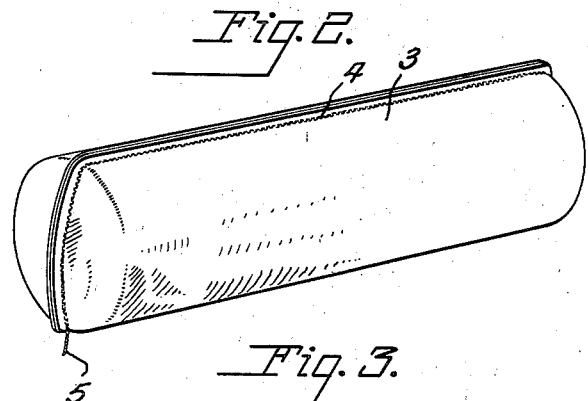
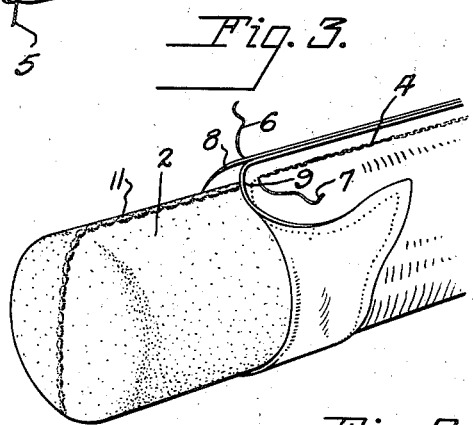
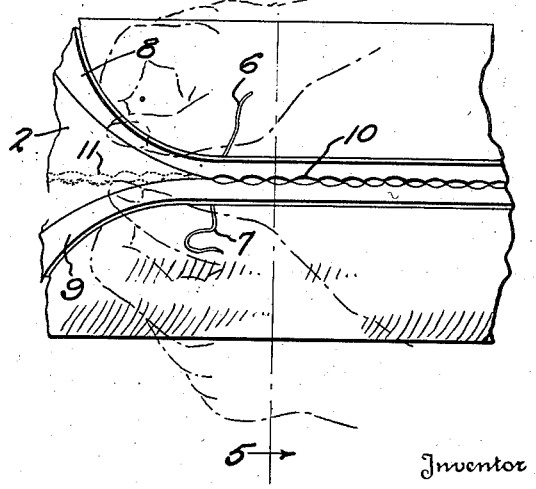
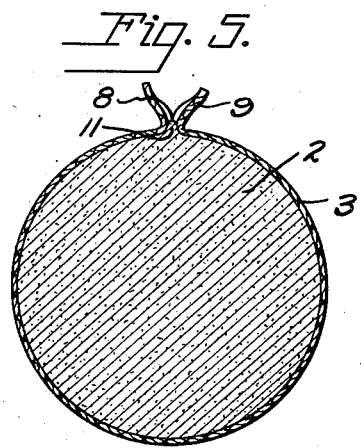
Inventor
George D. Morgan
By Mason Fenwick & Lawrence
Attorneys Patented Oct. 12, 1937

2,095,510

UNITED STATES PATENT OFFICE 2,095,510

MEAT PACKAGE

George D. Morgan, Richmond, Va.

Application December 4, 1936, Serial No. 114,254

5 Claims. (Cl. 99—174)

This invention relates to special meat packages of that type in which the meat, generally in comminuted cooked or cured condition, is forced under pressure into fabric bags which constitute a protective covering for the package.

Since the protective function of the bag may not be generally understood, it may be here stated that it not only prevents the enclosed meat loaf from being contaminated by dust or dirt as well as keeping it from becoming broken, but it also enhances the keeping qualities of the meat by preventing bacterial infection of the same. This it does in the following manner:

When the meat is first packed under pressure into the bag, the fabric fibres act as wicks absorbing the grease of the meat and distributing it in an unbroken film all over the surface of the loaf. Animal grease is a negative culture medium for bacteria; witness the country method of preserving cooked meat in jars by inundating it in melted lard. The film of grease on the meat loaf not only excludes bacteria, but it is also impervious to moisture and protects the meat loaf from drying out, losing weight and quality, when subjected to mechanical refrigeration.

The fabric bag may in many respects be considered an artificial rind, doing for the meat what the natural rind does for cheese, but it must be borne in mind that the bacterial and dehumidifying resistance which the meat package possesses, is present only so long as the surface grease film remains intact.

Most bag packed meat loaves are sold in retail stores where a few slices are cut from the loaf from time to time as ordered. It may take a week or more before the loaf is depleted. It has been customary in packing comminuted meats in bags, to give no special consideration to the bag except to employ a fine enough mesh so that the meat would not extrude therethrough. Ordinarily the seam is on the inside of the bag for the sake of neatness, and it becomes imbedded in the meat. The meat package comes to the retailer with the meat sewed up in the bag, and who, before making the first sale, must remove the bag or so much of it as may be necessary to get access to the meat. Since he cannot get at the seam, the meat clerk slashes the bag longitudinally with a meat knife and then peels the bag back for a sufficient distance to cut off the required number of slices.

It will be understood that the bag adheres tenaciously to the meat since it was forced in hot and soft at a pressure of fifty pounds and upward per square inch, and has set upon cooling, with the surface of the meat pressed into the interstices of the fabric meshes. The knife which is ordinarily used to slash the bag, not only cuts through the bag, but inevitably penetrates below the surface of the meat, carrying infection beneath the protective grease layer, and it is impossible to peel away any portion of the bag without breaking the imbedded seam out of the meat, thus further exposing the vulnerable parts of the meat loaf to deteriorating influences.

Since the bag must be peeled back further than the limit of the portion of meat loaf to be cut off, and as the meat clerk usually peels at least half the length of the loaf at a time as a matter of convenience to keep him from doing it at each small order, it is obvious that the meat package will be put back in the refrigerator with impaired bacterial and dehumidifying immunity, so that before the entire meat loaf has been sold, it may acquire a spoiled or moldy taste or become dried out.

The present invention has for its object to provide a meat package which takes into consideration the preservative functions of the bag and which makes it unnecessary to break the grease film protected surface of the meat loaf, either by using a knife to slash the bag or by breaking out the imbedded seam.

A further object of the invention is to provide in a meat package, a bag with the seam extending along one side and across one end of the bag, the edges of the seam being on the outside, the seam being sewed together by a rip string for opening the seam progressively for any part of its length, so that it is unnecessary to use a knife at all.

Another object of the invention is to provide the meat loaf with a relatively hard tear-resistant ridge along the line of breach of the seam which will remain intact under the initial peel stress.

Still another object of the invention relates to the provision of flaps along the seam and outwardly with respect to the line of stitching, which flaps function as finger holes, facilitating the initial peeling of the bag from the meat loaf.

Other objects of the invention will appear as the following description of a preferred and practical embodiment proceeds:

In the drawing throughout the several figures of which the same characters of reference have been employed to designate identical parts, Fig. 1 is a side view of a bag in the flat embodying the principles of the present invention.

Fig. 2 is a perspective view of the meat package made according to the invention.

Fig. 3 is a view similar to that of Fig. 2, a portion of the loaf being omitted, and the bag being shown as partially peeled and folded back.

Fig. 4 is a fragmentary view in plan indicating the initial act of peeling the bag, after having ripped the seam.

Fig. 5 is a cross section taken along the line 5—5 of Fig. 4.

Referring now in detail to the several figures, the numeral 1 represents in general a meat package consisting of the meat loaf 2 and the surrounding fabric bag 3. The meat loaf was pressed into the bag under a pressure of perhaps fifty pounds and upwards per square inch while hot and soft so that it has filled all the interstices of the bag, in fact the surface of the meat loaf has become embossed in the meshes of the fabric. Upon cooling the meat loaf has set in firm adherence to the bag, the latter serving in effect as a rind for the meat loaf.

The construction of the bag is as shown in Fig. 1, consisting of a folded sheet of suitable fabric, stitched together along its marginal portions at the end and along one side, by a row of rip stitching 4, by which is meant any type of stitching which will pull out when the free end is grasped.

In the present illustrated embodiment of the invention, the stitching is provided with a free tail 5 which may be cut off closely adjacent the bag exposing two strings 6 and 7, which when pulled in opposite directions, will ravel the row of stitching. The finished bag is not turned inside out as is customary, but the seam is left on the outside. The stitching 4 is placed sufficiently far back from the peeling edges of the folded fabric to produce flaps 8 and 9 forming a convenient finger hold as is illustrated in Fig. 4.

It is to be understood that the pressure under which the meat is packed distends the seam sufficiently along the line of stitching to stretch the stitches open slightly as is indicated to an exaggerated degree at 10 in Fig. 4. The meat extrudes slightly into these interstices and forms the ridge 11 shown in Fig. 3. This ridge, due to its slight exposure to the air, becomes harder than the rest of the surface of the meat loaf. This is the part of the meat loaf which stands the greatest strain for it is where the peel of the bag begins. The relative hardness of the ridge 11 as well as the advantageous angle which its sides make with the adjacent portions of the bag, cause it to withstand the peeling stress without the surface of the meat loaf becoming ruptured.

As has been stated in connection with the object of this invention, the wick-like nature of the fabric of the bag causes it to uniformly distribute an unbroken film of grease on the surface of the meat loaf, which protects the meat loaf from bacterial infection. It is not necessary for the meat clerk to impair this protective layer or coating. For opening the meat package, it is necessary merely to cut the tail 5 and pull the strings 6 and 7, ravelling the stitch across one end and as far along the side of the meat loaf as may be necessary to give access to the amount of loaf to be cut off. The clerk then grasps the flaps 8 and 9, the bases of which flaps lie against the sides of the ridge 11, and pulls them apart. After the initial breach of the seam, it is not difficult to pull the bag back exposing the requisite extent of the meat loaf.

It is obvious that since it is not necessary to use a knife in cutting the bag or any part of the seam and since the seam is on the outside and therefore not imbedded in the meat, there is no necessity for rupturing or in any way impairing the bacterial and dehumidifying resistance of the surface of the meat loaf.

The fact that the bag is not damaged in removing it from the meat loaf, is of advantage since the bag can be laundered and used for towelling or any other similar purpose.

While I have in the above description disclosed what I believe to be a preferred and practical embodiment of my invention, it will be understood by those skilled in the art, that the details as shown and described are by way of example, and that the use of the invention is not restricted to a loaf of comminuted meat, but that it includes every meat package in which the functions of the bag are exercised in the manner herein set forth.

What I claim as my invention is:

1. A meat package comprising in combination a fabric bag and a meat mass therein molded under pressure to the contour of the distended bag, the latter having an external seam, extending lengthwise of said bag and across one end, said seam being closed by rip stitching accessible from the outside of said bag for progressively breaching said seam.

2. A meat package comprising in combination a fabric bag and a meat mass therein molded under pressure to the contour of the distended bag, the latter having an external seam extending lengthwise of said bag and across one end, having external flaps adapted to function as finger holds for peeling the bag away from the enclosed meat mass, said seam being closed by a row of rip stitching accessible from the outside of said bag for ravelling said stitching for progressively breaching said seam.

3. A meat package comprising in combination a fabric bag and a meat mass therein molded under pressure to the contour of the distended bag, the latter having an external seam extending lengthwise of said bag and across one end, having external flaps to function as a finger hold for peeling the bag from the enclosed meat mass, said seam being closed by a row of rip stitching accessible from the outside, enabling it to be ravelled progressively for breaching said seam, said meat mass having a ridge coincident with said seam at the bases of said flaps for resisting initial peeling stress exercised in the removal of said bag.

4. A fabric bag adapted to receive and conform a meat mass introduced under pressure into said bag, having an outside seam extending along continuously on one side and across one end and having external flaps attached to function as finger holds in peeling said bag from the enclosed meat mass, said seam being closed by a line of rip stitching attached, to be ravelled from the outside of said bag for breaching said seam.

5. A meat package comprising in combination a fabric bag and a meat mass therein molded under pressure to the contour of the distended bag, the latter having an external seam extending lengthwise of said bag and across one end, said seam being closed by a row of rip stitching accessible from the outside of said bag for ravelling said stitching for progressively bridging said seam, and said meat having a ridge coincident with said seam of firmer texture than the adjacent meat for resisting the initial peeling stress which starts at said seam.

GEORGE D. MORGAN.